United States Patent
Wharton

[15] 3,702,100
[45] Nov. 7, 1972

[54] MOLDED PALLET

[72] Inventor: Thomas P. Wharton, Neehah, Wis.

[73] Assignee: Menasha Corporation

[22] Filed: April 5, 1971

[21] Appl. No.: 131,087

[52] U.S. Cl. ..................................... 108/58, 108/53
[51] Int. Cl. ............................................. B65d 19/38
[58] Field of Search ...................... 108/51–58; 294/67

[56] References Cited

UNITED STATES PATENTS

| | | | |
|---|---|---|---|
| 3,359,929 | 12/1967 | Carlson | 108/58 |
| 3,424,110 | 1/1969 | Toot | 108/53 |
| 3,433,184 | 3/1969 | Addy | 108/53 |
| 3,167,341 | 1/1965 | Higgins | 294/67 |
| 3,228,358 | 1/1966 | Sepe et al. | 108/58 |
| 3,467,032 | 9/1969 | Rowlands et al. | 108/51 |
| 3,511,191 | 5/1970 | Barry, Jr. et al. | 108/51 |
| 3,561,375 | 2/1971 | Hammond | 108/53 |

Primary Examiner—Bobby R. Gay
Assistant Examiner—Glenn O. Finch
Attorney—John J. Chrystal et al.

[57] ABSTRACT

The invention relates to lightweight, nestable, reusable, molded plastic pallets used for support and transport of articles stacked thereon. The pallet has a generally corrugated structure, the transverse cross-sectional contour of the corrugations being trapezoidal in shape. The corrugations in the medial portion of the pallet are formed in concentric rectangles so as to reinforce each other and minimize distortion and racking. A series of spaced corrugations are also positioned in parallel relation to each side of the pallet. All corrugations are reinforced in a direction opposite to the longitudinal axis of the corrugations by integral spaced ribs between the corrugations at the top face and lower face of the platform. These reinforcing ribs are aligned so as to provide continuous spaced beams or extending through the pallet body lengthwise and crosswise to provide maximum strength and stiffness in the direction opposite to the axes of the corrugations. The construction results in omni-directional strength and stiffness of the pallet. The ribs are also of such height as to act as stacking supports when the pallets are nested to provide strength to hold and distribute the weight of the stacked pallets and also to prevent jamming and sticking together of one pallet within another. The pallet is provided with a plurality of spaced integral hollow feet depending from the bottom face of the platform which have a rectangular truncated pyramidal contour. The inner bottom walls of the feet are provided with integral reinforcing cross-ribs. The side walls of the feet are also reinforced by the adjacent ends of the corrugations integrally molded therewith. The pallet is also provided at its outer periphery with a continuous integral L-shaped turned-down channel which is also reinforced with spaced transverse ribs to protect the edges of the pallet against abuse or damage by accidental mechanical impact.

10 Claims, 20 Drawing Figures

INVENTOR.
THOMAS P. WHARTON

ATTORNEY.

INVENTOR.
THOMAS P. WHARTON

BY
ATTORNEY.

INVENTOR.
THOMAS P. WHARTON

MOLDED PALLET

SUMMARY OF THE INVENTION

This invention relates to a relatively lightweight, nestable, reusable pallet construction made of molded plastic material.

In the development of reusable molded plastic pallets, the major objective is to impart to the pallet the greatest stiffness and strength with the use of the least amount of material, least machine production time, and least investment in molding machinery. These requirements have been met by an invention which utilizes and combines a unique design, an efficient type of material, and a particularly suitable manufacturing process.

From the design standpoint, these requirements are met by the use of a unique corrugated platform. Since a corrugated platform is weaker, in bending strength and stiffness in the direction perpendicular to the axes of the corrugations, however, three important structural features are embodied in the corrugated platform according to my invention to overcome this weakness. First, the corrugations are made generally trapezoidal in shape, rather than in the conventional wavy corrugated shape, to provide more material in the flange areas of the cross-section. These flat surfaces act as the flanges of an I-beam. The near-vertical portions of the corrugations act as the web of an I-beam, although they are sloped for easy removal from the mold and to permit nesting. This shape also provides the necessary flat surfaces on the top of the pallet platform for the pallet load and on the bottom of the pallet platform for sufficient area of contact with the tines of the mechanical handling equipment such as lift trucks. Secondly, in the medial portion of the pallet the corrugations are positioned in concentric rectangles so as to support each other and minimize distortion and racking. This positioning of the corrugations also provides greatest strength in the areas between the pallet feet which will bear on the tines of the lift truck when handled since the corrugations run transverse to the lift truck tines. Thirdly, in the direction opposite to the corrugations, which is the weaker direction of any conventional corrugated structure, strength and stiffness are increased by the provision of integral beams at ribs between corrugations on the top and bottom of the platform. These ribs are aligned so as to provide continuous spaced beams through the pallet body to provide maximum strength and stiffness in the direction opposite to the corrugations.

From the standpoint of the type of material selected, greatest strength and stiffness can be obtained with the least amount of plastic material by the use of a type of plastic foam. With this material, the pallet body has walls of substantially uniform thickness and in cross-section have dense surface zones or skins and rigid interior cellular cores. The overall thickness, for example, may be ¼ inch and the outer skin may have a thickness of 1/32 or 1/16 inch. A pallet of 40 × 48 inches in size would weigh only about 23 pounds. This type of material produces a molded pallet of unusual strength since the skins act as the flanges of an I-beam and the interior cellular core acts as the web of the I-beam.

The stated goals can be achieved from a production standpoint by using a form of injection molding known as the structural foam process. With this process, the pallets are made by injecting into a closed mold having the required contoured elements, a plastic resin, such as high-impact polystyrene, high-density polyethylene, or other thermoplastic containing a suitable foaming agent. The plastic foam composition is injected into the mold cavity which solidifies the composition in the area immediately adjacent to the mold surfaces but allows the composition to expand and then cool more slowly and form a cellular structure in the core area. This results in pallet which has a hard solid smooth integral plastic skin and a cellular foam center or core. The overall density of the resulting material is about half that of solid plastic. In other words, the resulting structural foam is about half air. The number of pounds of plastic resin needed to mold the pallet, therefore, is about half the amount which would be needed if the pallet were molded of solid plastic. Thus, a pallet can be made of structural foam for about half of the material cost.

The structural foam molding process employs low pressure molding and therefore involves the use of less expensive molds, and this process also permits the use of molding presses of lower capacity and less investment cost. In addition, further efficiencies can be accomplished by keeping all the structural members of the pallet construction of a uniform and thin thickness, since the time cycle of the molding operation is determined by the time needed to cure the thickest component of the pallet. Pallets can be molded in a relatively short time cycle, reducing molding costs. Automatic molding equipment is available so that labor costs are relatively low. All of these factors contribute to the economic manufacture of this molded plastic pallet of structural foam plastic.

Commercial methods of producing thermoplastic structural foams are described in Modern Plastics Encyclopedia 1969–1970, published by McGraw-Hill, New York, pages 243–247. Also in Foamed Plastics, Vol. 9, Encyclopedia of Chemical Technology, 2nd Ed. 1966, pages 847–884, and U.S. Pat. No. 3,268,636, Aug. 23, 1966.

ILLUSTRATIVE EMBODIMENT

The advantages and novel features of my molded pallet construction will be apparent from the following description of the preferred embodiment of my invention, wherein.

Figure 1:
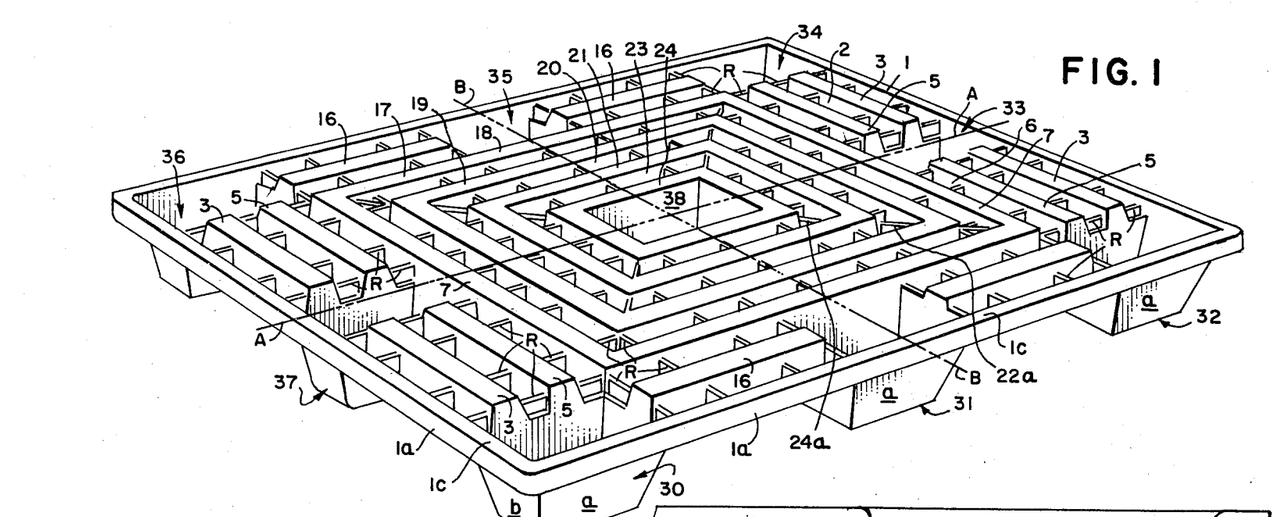
FIG. 1 is a perspective top view of the pallet.

Referring to the drawings, FIG. 1 illustrates an integral one-piece rectangular molded structural foam plastic pallet with its top deck or load-supporting surface positioned to support any desired load thereon. The pallet body is of a generally corrugated structure formed by a series of spaced corrugations which extend in parallel relation to each of the sides of the pallet. The spaced corrugations extending in parallel relation to sides "A" and "C" of the pallet are designated by like numerals 2 to 13 inclusive in FIG. 2, and like numerals 15 to 24 inclusive designate the spaced corrugations extending in parallel relation to sides "B" and "D" of the pallet. The pallet construction is symmetrical with respect to its longitudinal axis A—A and transverse axis B—B, shown in FIG. 1, so that each of the quarter sections of the pallet has the same symmetrical contour and structure.

Figure 2:
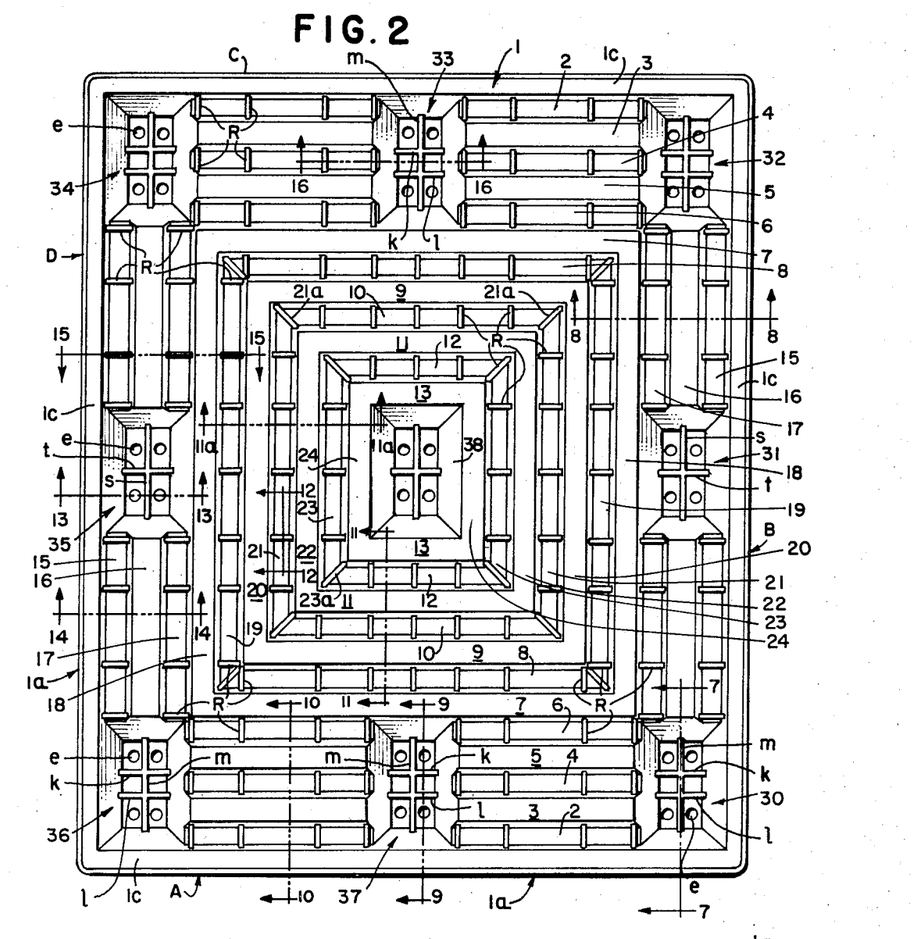
FIG. 2 is a plan view of the top of the same pallet.
Figure 10:
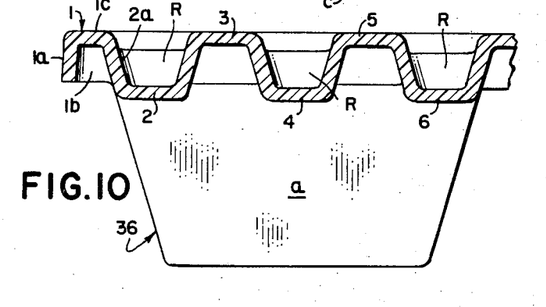
FIG. 10 is a sectional view taken through the deck along line 10—10 of FIG. 2.
Figure 11:
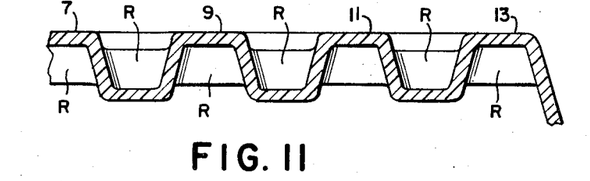
FIG. 11 is a sectional view taken through the deck along line 11—11 of FIG. 2, and also illustrates the same view as taken on line 11a-11a of FIG. 2.
Figures 19, 20:
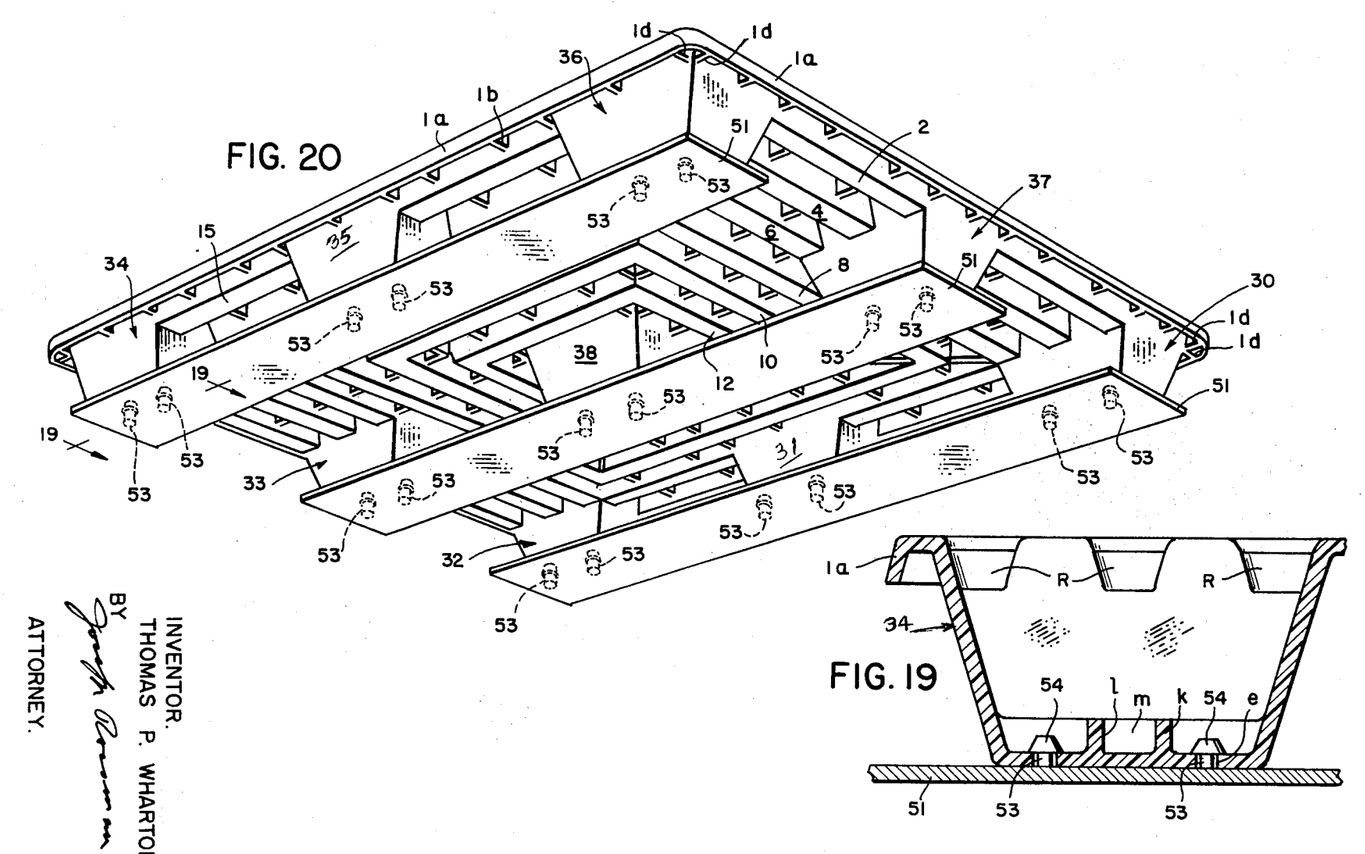
FIG. 19 is an enlarged sectional view taken on lines 19—19 of FIG. 20.
FIG. 20 is a perspective view of the bottom face of still another modified pallet construction.

Except for the channel 1 extending about the entire periphery of the pallet, the corrugations 2 to 13, and 15 to 24, have the same transverse cross-sectional contour, as shown in FIGS. 8, 10, 11, and 14, which is in the form of a regular trapezoid having inclined opposed sides and horizontally disposed upper and lower connecting base portions, as shown for example in FIG. 11. The horizontally disposed base portions of the trapezoidal corrugations constitute a top planar loading supporting platform as shown in FIG. 1 and FIG. 2. Likewise, the opposed bottom planar surface of the pallet is constituted by the horizontally disposed base portions of the trapezoidal corrugations as shown in FIG. 3 and FIG. 20.

Figure 3:
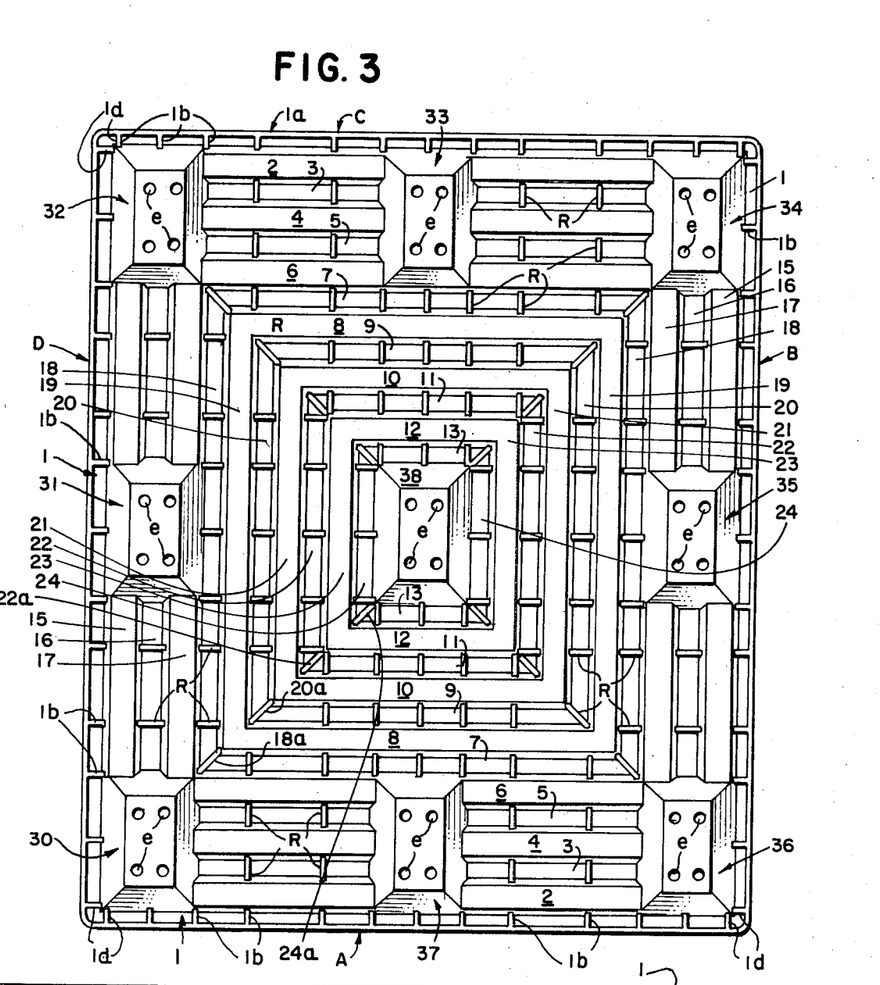
FIG. 3 is a plan view of the bottom of the pallet.
Figure 4:
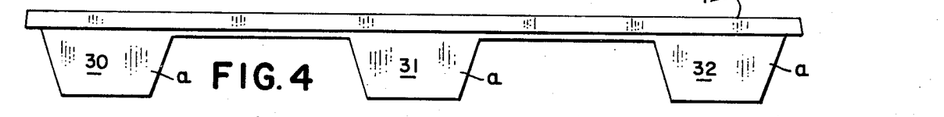
FIG. 4 is a side view of the pallet.
Figure 5:
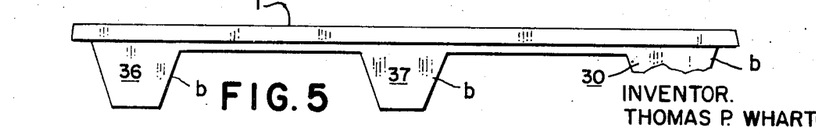
FIG. 5 is an end view of the pallet.

The inwardly positioned corrugations 7 to 13 inclusive and 18 to 24 inclusive are arranged in a concentric rectangular pattern, as shown in FIGS. 1, 2 and 3, which are continuous for each of the respective rectangles that constitute the medial body portion of the pallet.

Figure 8:
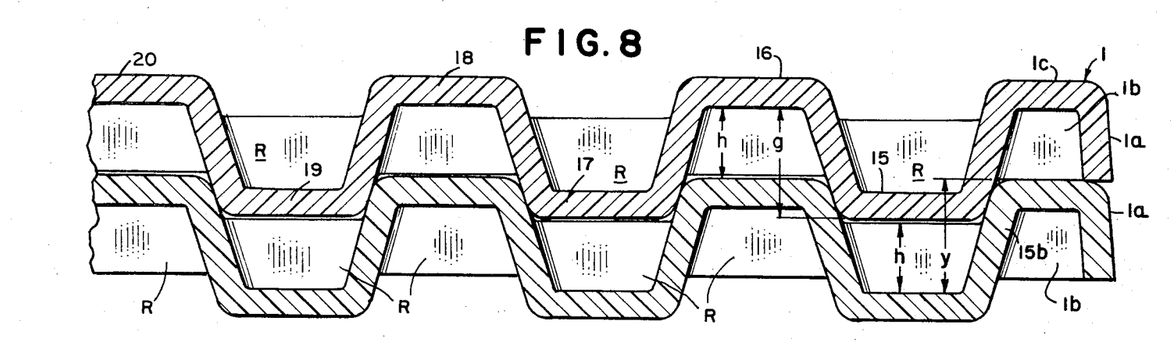
FIG. 8 is an enlarged sectional view taken through the deck of two nested pallets along line 8—8 of FIG. 2.
Figure 12:
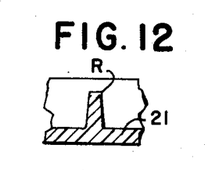
FIG. 12 is a sectional view taken through a cross-rib along line 12—12 of FIG. 2.
Figure 13:
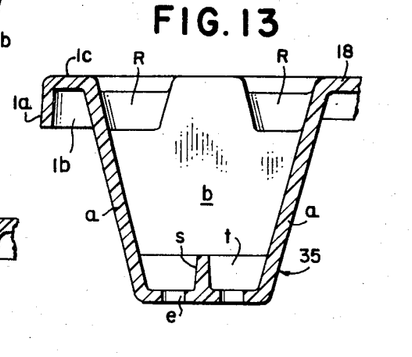
FIG. 13 is a sectional view taken through a supporting leg along line 13—13 of FIG. 2.
Figure 14:
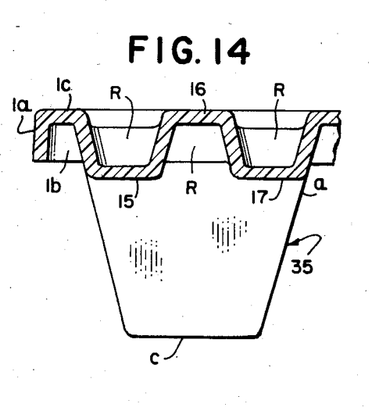
FIG. 14 is a sectional view taken through the deck along line 14—14 of FIG. 2.

Each of the corrugations of the pallet is reinforced by spaced transverse integrally molded reinforcing ribs designated by the letter "R." These ribs are positioned in both the top and the bottom faces of the pallet body as shown in FIGS. 1, 2, 3, and 20. Each of these ribs "R" extends to the same height "h" from the base of each corrugation and is shorter than the height "y" within the sides of the corrugations, as shown in FIG. 8, as well as in FIGS. 1, 10, 11, and 14. These reinforcing ribs also have substantially the same transverse cross-sectional thickness, as shown for example in FIG. 12, and are slightly tapered upwardly to permit easy removal of the part from the mold.

Figure 15:
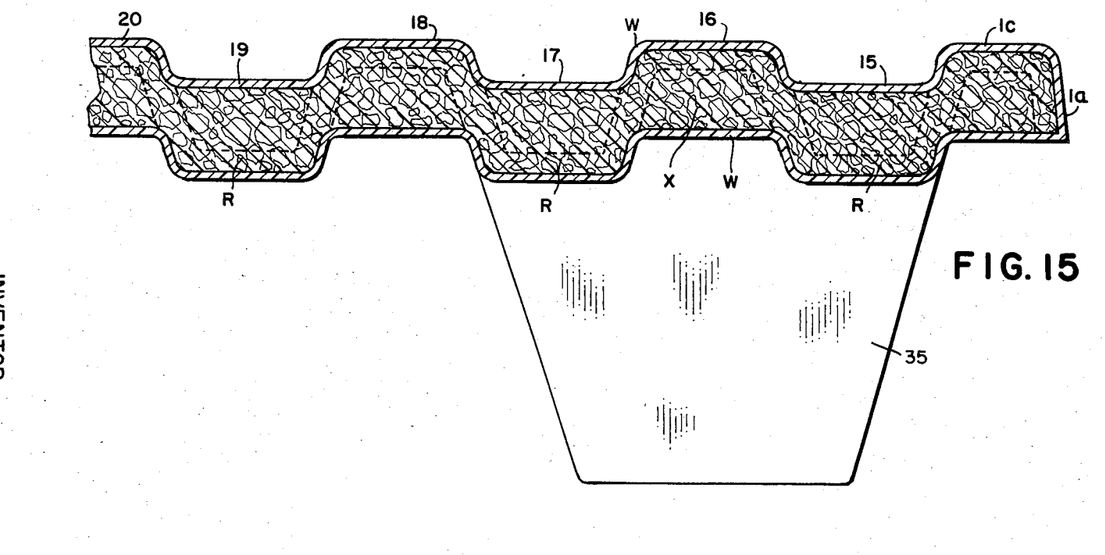
FIG. 15 is an enlarged sectional view taken through the deck on the center line of a row of cross-ribs along line 15—15 of FIG. 2.

The reinforcing ribs "R" are longitudinally aligned and positioned at right angles with respect to each side of the pallet throughout the pallet construction as can be seen in FIGS. 1, 2, and 3. These ribs are integrally molded with the respective inclined sides and connecting base of the corrugations and function structurally as a series of reinforcing struts constituting continuous uninterrupted beams, as shown in enlarged cross-section in FIG. 15. The ribs "R" merging with the adjacent sides of the corrugations reinforce the pallet body along all its axes to resist bending stresses imposed on the load bearing upper deck as well as against any upward lifting stresses imposed on the lower pallet surface by the tines of a fork-lift. An inspection of FIGS. 1, 2 and 3 clearly shows that the described series of reinforcing ribs molded integrally with the respective sides of the corrugations functions as spaced continuous reinforcing beams extending at right angles to each side of the pallet for the entire width and length of the pallet body.

As shown in FIG. 2, the intersecting corrugations 10 and 21 are reinforced at their corners by diagonal reinforcing ribs 21a. Also intersecting corrugations 12 and 23 are reinforced at their corners by diagonal reinforcing ribs 23a. Likewise as shown in FIG. 3, intersecting corrugations 7 and 18 are reinforced at their corners by diagonal integral reinforcing ribs 18a. Also intersecting corrugations 9 and 20 are reinforced at their corners by diagonal integral reinforcing ribs 20a. Intersecting corrugations 11 and 22 are reinforced at their corners by diagonal integral reinforcing ribs 22a. Intersecting corrugations 13 and 24 are reinforced at their corners by diagonal integral ribs 24a. These diagonally extending ribs are of the same height and thickness as reinforcing ribs "R." It will be evident that the described diagonally aligned corner reinforcing ribs constitute continuous diagonal beams reinforcing each of the corners of the rectangular corrugations which resist stresses which may be imposed either on the deck or the bottom face of the pallet and minimize distortion and racking of the pallet under load stresses. The concentric rectangular corrugations provided in the medial portion of the pallet reinforce each other.

The pallet is also provided at its outer entire periphery with a continuous integrally molded generally L-shaped channel, designated generally by numeral 1 at the sides of the pallet. As shown in FIG. 10, channel 1 is integrally molded with the side 2a of adjacent corrugation 2. The side 1a of channel 1 extends downwardly to form a side margin of the pallet. Side 1a also slopes outwardly of the vertical at a slight angle to permit easy removal of the part from the mold, and has a length which is somewhat shorter than the sides 2a of adjacent channel 2 for a purpose to be explained later. The horizontal surface 1c of channel 1 forms a relatively narrow flat margin which extends about the entire periphery of the pallet. The upper horizontal surface 1c is co-planar with the upper faces of the successive bases of channels 3, 5, etc. Channel 1 at side B of the pallet likewise has a similar cross-sectional contour and is integrally molded with the adjacent side 15b of corrugation 15 as shown in FIG. 8. The respective channels are reinforced by spaced transverse ribs designated by numerals 1b. The height of ribs 1b is substantially the same as height of the reinforcing ribs "R" of the spaced corrugations previously described. As shown in FIG. 3, the spaced channel reinforcing ribs 1b are aligned with the spaced reinforcing ribs "R" of the adjacent corrugations, thereby extending the strut reinforcement of the aligned ribs "R" to the marginal sides of the pallet as clearly shown in FIG. 15. The channels 1 intersecting at each of the corners of the pallet are preferably rounded as shown in FIGS. 1, 2 and 3, and are reinforced by reinforcing ribs 1d at each corner where they intersect at right angles.

Referring to FIGS. 1, 2, 3, 4 and 5, the pallet is provided with a plurality of supporting feet, or legs, with these feet designated generally by numerals 30, 32, 34 and 36, extending below the lower face of the deck at each corner of the pallet, and with legs 31, 33, 35 and 37 positioned intermediately of the corner legs. Also a supporting leg 38 is positioned in the medial portion of the pallet body. Each of the supporting legs has the shape of a truncated rectangular pyramid having downwardly inclined opposed side walls "a," opposed inclined end walls "b, and bottom wall "c." The legs are substantially of the same overall dimensions and height, and have their longer sides "a" aligned lengthwise with the longer side "B" and "D" pallet as shown in FIGS. 2 and 3.

The bottom walls of the supporting feet are provided with a plurality of openings "e" which permit drainage of the legs in event water accumulates therein. Also these openings are adapted to receive fastening means for retaining auxiliary runners or a bottom platform as will be described in connection with FIGS. 17 to 20 hereinafter. The bottom walls of the supporting feet are reinforced with integrally molded ribs which extend for a short distance above the bottom wall as shown in FIGS. 2, 7, 9 and 16. The bottom walls of the corner supporting feet 30, 32, 34, and 36 and the intermediate end supporting feet 33 and 37 are provided with spaced reinforcing ribs "k" and "l" which transversely intersect medial rib "m" as shown in FIG. 2. The bottom walls of the intermediate supporting feet 31 and 35 and the medial supporting foot 38 are provided with integrally molded reinforcing intersecting ribs "s" and "t." As shown in FIG. 2, these reinforcing ribs "k," "l," "m," "s" and "t" are aligned with the respective ribs "R" which reinforce the adjacent corrugations or with the near-vertical walls of the adjacent corrugations.

Figure 16:
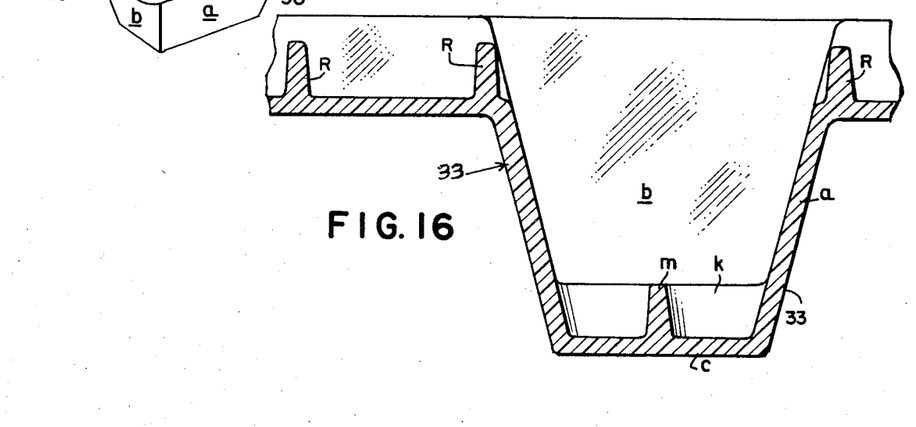
FIG. 16 is a sectional view taken through a supporting leg along line 16—16 of FIG. 2.

Referring to FIGS. 1, 2 and 3, the ends of the corrugations 2 to 6 which are parallel to the sides "A" and "C" of the pallet terminate and are integral with the side walls "a" of the adjacent corner feet and intermediate supporting feet. Likewise, the corrugations 15, 16 and 17 which are parallel to the sides "B" and "D" of the pallet terminate and are integral with the end walls "b" of the adjacent corner feet and intermediate supporting feet. As shown in FIG. 16, the reinforcing ribs "R" located at the upper open rib of the supporting feet are slightly offset from the adjacent side walls "a" so that they may be vertical, to facilitate molding, and still have the same thickness and height as the other adjacent reinforcing ribs "R" with which they are aligned; otherwise, these ribs would either present an undercut which would catch on the mold or would have extra thickness which would cause hot spots and imperfect mold and a longer cooling cycle.

Figure 7:
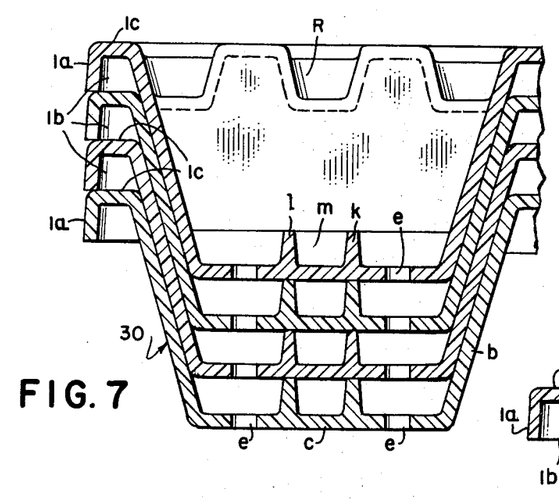
FIG. 7 is a sectional view taken through a supporting leg of four nested pallets along the line 7—7 shown in FIG. 2.
Figure 9:
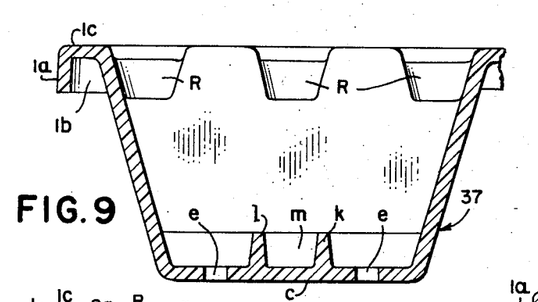
FIG. 9 is a sectional view taken through a supporting leg along line 9—9 of FIG. 2.

FIG. 7 is a sectional view similar to FIG. 9 showing four identical nested and stacked pallets. It will be seen that the supporting feet of each pallet, such as for example foot 37, nest within each other and the outer face of bottom wall "c" of each foot is supported and rests on the ribs "k", "l" and "m" projecting above the inner face of the adjacent bottom wall "c" of the pallet feet. This construction ensures that the nested feet will not jam or bind together and will readily separate when the individual pallets are separated. Also referring to FIG. 8 which illustrates two nested and stacked pallets, as previously described, the transverse reinforcing ribs "R" are of a height "h" less than the height "y" of the opposed inclined legs of the corrugations. This construction provides stacking supports for the entire platform of each pallet and also prevents the stacked pallets from separately slipping and sliding sidewise.

Figure 6:
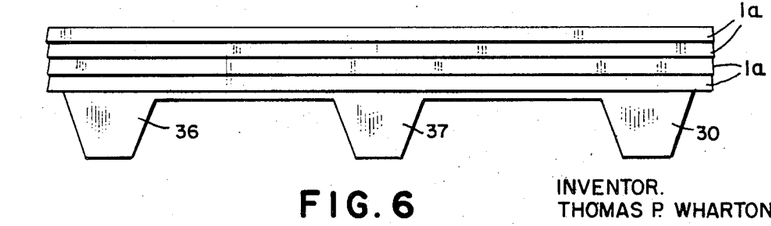
FIG. 6 is an end view of four nested and stacked pallets having the construction shown in FIG. 1.

Referring to FIGS. 6, 7 and 8, it will be seen that when the pallets are stacked, the marginal channel 1 is positioned so that the lower edge of the marginal leg 1a abuts and is supported on the horizontal leg portion 1c of the pallet nested beneath it. Also, the transverse reinforcing channel ribs 1b also abut and are supported on the horizontal leg portion 1c of the pallet therebeneath. It will thus be seen that all corresponding portions of the pallet are nestable and are completely supported by each other when stacked at any desired height and can be individually removed from the stack without jamming or binding together.

The advantages of using lightweight thermoplastic structural foam in making the pallet construction were previously discussed. Referring again to FIG. 15, the enlarged cross-section of the body portion of the pallet clearly illustrates the continuous solid plastic outer skin, designated by letter "w," which is relatively thin compared to the inner rigid porous core, designated by letter "x." As explained previously, such structural foam plastic has high structural strength and rigidity and is particularly advantageous in providing pallets which overcome the disadvantages or prior pallets.

MODIFIED PALLET CONSTRUCTIONS

Figures 17, 18:
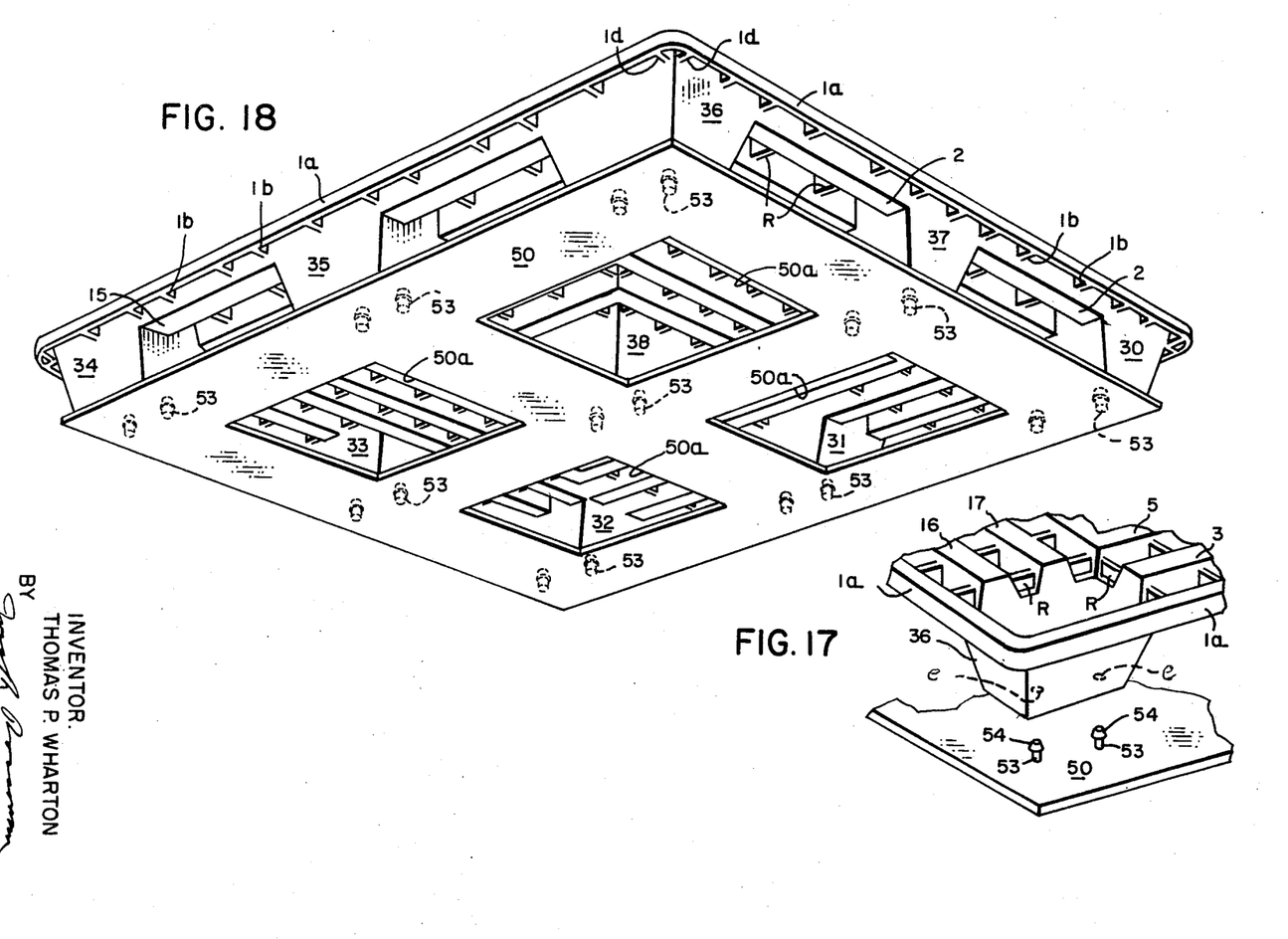
FIG. 17 is a fragmental exploded perspective view of a modified pallet construction.
FIG. 18 is a perspective view of the bottom face of the modified assembled pallet construction.

The previously described molded pallet construction is adapted to be combined with auxiliary bottom platform 50 which is suitably attached to the supporting feet of the pallet. The auxiliary bottom platform 50 may be of a flat board or of corrugated or ribbed configuration depending upon the desired strength and durability of the auxiliary bottom platform. Referring to FIGS. 17 and 18, an auxiliary molded plastic platform 50 having the same or slightly smaller overall dimensions as the molded pallet is attached to the legs of the pallet by integrally molded fastening studs or pins 53 that extend into the openings "e" in bottom surface of the supporting feet of the pallet. The pins 53 are provided at their ends with flexible or compressible frustro-conical shaped locking heads 54 made for example of a suitable elastomeric material which are shaped or adapted to be pushed or squeezed through the openings in the bottom walls of the supporting feet of the pallet and then can expand inside the leg into locking mechanical engagement with the inside face of the bottom wall of the legs, as shown in FIG. 19. The auxiliary bottom platform 50 may be provided with a plurality of spaced openings 50a which are adapted to receive or accommodate rollers or any elements protruding above the supporting base of a hand truck when the assembled pallet is loaded on the hand truck.

Instead of attaching a single auxiliary platform previously described, separate spaced molded plastic bottom runner strips 51, 52 and 53 may be attached to the aligned three rows of the supporting legs, as shown in FIG. 20, in a manner described above and shown in FIG. 19. The length of the runners may be the same or slightly less than the length of the pallet. The runners may be aligned lengthwise or crosswise of the pallet. The auxiliary bottom runners may be flat strips or of corrugated or ribbed configuration depending upon the desired strength and durability of the auxiliary bottom runners.

ADVANTAGES OF THE INVENTION

The present molded structural foam plastic pallet offers many advantages over prior molded plastic and thermoformed plastic pallet constructions. Heretofore, plastic pallets have not been economically feasible because they have been either too weak and flexible or too costly. The combination of the unique design of this pallet and the structural foam plastic process of injection molding results in a pallet with the required strength and stiffness and a pallet which is competitively priced.

The molded plastic pallet also offers many advantages over conventional wooden pallets which are susceptible to wear, warp, splitting, shrinkage, mildew, rotting, contamination and breakage during reuse which entail prohibitive repair and maintenance costs that are often greater than the replacement cost. My molded pallet, in addition to being lightweight and easily handled, is unusually strong and resist fracture or other damage by accidental impacts. My pallet also will not wear, warp, shrink, mildew, rot or deteriorate upon exposure to moisture and extremes of weather conditions during storage or use. They can be easily washed or sterilized. They can be reused many times without repair costs.

Although the present pallet is generally of a corrugated structure, its unique design has remarkable omnidirectional strength and resistance to bending under load stresses through the full width and length of the pallet deck. The pattern of overall concentric enclosed rectangular corrugations in the medial area of the pallet, as previously described, provides a deck with omnidirectional strength since it has no continuous lines of corrugations which would result in a weak axis, and has no intersections of corrugations, which would result in a point of stress concentration. This strength and stiffness are increased by the transverse aligned reinforcing ribs molded between the corrugations in both the top and bottom surfaces of the deck which function as a continuous beam. Furthermore, the reinforcing ribs are of such predetermined height as to act as stacking supports when the pallets are nexted to provide strength to hold the weight of the stacked pallets, as previously described, and also to prevent jamming and binding together of one pallet within another.

The dimensions and configuration of all the structural elements of the top and bottom deck surfaces of the pallet are proportioned so that the empty pallets can be nested for shipment or storage. The pallets are molded of uniform wall thickness in matched metal molds which are the mirror image of the top and bottom surfaces of the pallet. The walls of the corrugations and feet are sloped to facilitate release of the pallet from the mold. The undersurfaces of the pallet have a taper that is the same as in the upper surface of the pallet so that the pallets are nestable. In my preferred pallet construction, each pallet requires only about one inch of stacking height even though each pallet when supported on a floor is five inches high. The top and bottom faces of the pallet are planar. The loaded pallets can therefore be readily moved over a floor or may be carried on various conveying devices including those having a series of rollers. The stacked nested pallets interlock with each other as previously explained, so that a stack of nested pallets will not slide relative to each other and the stack will not fall.

The corrugated structure of the pallet provides approximately equal exposed horizontal areas on the top and bottom surfaces of the pallet inasmuch as all the corrugations are of the same trapezoidal cross-section. These horizontal surfaces also function as the flanges of an I-beam when subjected to either downward or upward bending loads encountered by pallets. The hollow legs of the pallet which are molded in the form of rectangular truncated pyramids have sloping sides at an angle which permit almost complete nesting. The reinforcing ribs in the bottom wall of the feet provide additional strength. The openings in the bottom wall permit drainage of the hollow feet and also permit the attachment of a supplemental bottom deck or runners as previously described which enhance the versatility of use of the present pallet construction. Also as explained previously the feet are reinforced at their sides by the spaced corrugations which terminate and are integrally molded with the sides of the legs. The parallel alignment of the legs permits the pallet to be rolled over roller-conveyors without catching.

The construction of the pallet legs provides strength against buckling, breaking or overturning which is a common weakness in prior pallets. As previously described, the side walls of the legs which are integrally molded and merged with the adjacent ends of the corrugations at the open end of the legs are reinforced and supported at the merged positions so that stresses imposed on both the top and the bottom surface of the pallet deck are more evenly distributed and thus the leg stability is greatly increased. Also the cross-ribs integrally molded with the inner bottom surface and adjacent side walls act as braces or supports to the vertical walls of the legs, and also they provide added strength by reducing the unsupported height of the leg walls thus making the vertical walls of the legs considerably more resistant to buckling, breaking or overturning.

The outer margins of the pallet are protected by the continuous L-shaped channel which is reinforced throughout the pallet perimeter by the transverse integral molded ribs. The edges of prior pallets are vulnerable to damage by being hit by fork trucks, and also insufficiently strong to properly support and resist the compressive stresses of metal banding used for strapping the load to the pallet. These serious disadvantages are overcome by the unusually strong and reinforced outer edges of the present pallet.

In addition to the many structural advantages of the present pallet, as previously outlined, the relatively low cost of the pallet offers considerable savings in shipping or storage. Goods may be shipped loaded on the pallets directly to the consignee without removal of the pallets. This results in saving of time required to unload the pallets before shipping and obviates reloading the goods on another pallet at the destination. The pallets may be stacked nested for storage or reshipment prior to reuse requiring very little storage space.

Other advantages of the molded plastic pallet besides its lightweight include low cubage, durability, capability of being pigmented for color coding, capability of being washed, resistance to mold, mildew, fungus, or rotting, and suitability for embossed markings for identification purposes. A rectangular pallet of size 40 by 48 inches having a uniform wall thickness of ¼ inch made of molded structural plastic foam weights approximately 23 pounds as compared with conventional wooden pallets which weigh from 70 to over 100 pounds each. Thus, empty pallets of this invention can be handled by laborers (male and female) as compared with wooden pallets which must be handled by lift trucks. One hundred pallets can be nested in a stack only 104 inches high, as compared with wooden pallets which require about five times this amount of space. This means that about five times as many empty plastic pallets can be shipped in a truck or rail car for about the same costs as the shipment of wooden pallets.

It is to be understood that the specific embodiments of the invention herein described are illustrative of the novel features of this invention and that changes and modifications of the specific details of construction may be made which are intended to be included within the scope of the appended claims.

I claim:

1. A unitary rectangular pallet for supporting and transporting loads thereon comprising a body formed in a series of spaced parallel corrugations, the transverse cross-sectional contour of the corrugations being in the form of regular trapezoids having inclined opposed legs and horizontally disposed upper and lower base portions interconnecting adjacent pairs of opposed legs, with each of said base portio having an inner face, the successive corrugations being reinforced by a plurality of spaced beams integral with said inner faces of said base portions and at least a portion of each leg and extending transversely between pairs of said opposed legs and substantially perpendicularly from said inner face of the base portions, said beams being positioned in the successive corrugations in longitudinal alignment constituting continuous beams for resisting bending stresses exerted on the pallet, the said horizontally disposed exposed upper trapezoid base portions of said corrugations constituting a top planar load-supporting platform and the oppositely disposed exposed lower portions constituting the bottom face of the platform adapted for engagement by fork-lift tines or tying means for securing loads to the pallet.

2. A pallet as defined in claim 1 wherein the pallet is provided with a plurality of hollow supporting feet extending below the bottom face of the pallet platform and positioned in aligned spaced rows to permit insertion of fork-lift tines therebetween.

3. A pallet as defined in claim 2 wherein the supporting feet and corrugation are molded in a unitary structure, said feet being nestable and tapered downwardly in a shape of a truncated rectangular pyramid having opposed inclined side walls and a bottom wall, the external bottom walls of said feet being flat and co-planar on the exposed exterior surface thereof and provided on the inner surface thereof with integral reinforcing beams extending transversely between the opposed side walls of the feet and extending for a relatively short height above said bottom wall.

4. A pallet as defined in claim 3 wherein the bottom walls of the supporting feet are provided with openings adapted for drainage and for receiving means to retain spaced auxiliary bottom runner strips or an auxiliary bottom platform.

5. A pallet construction as defined in claim 3 wherein spaced auxiliary bottom runner strips or an auxiliary bottom platform are attached to the bottom of the supporting feet.

6. A pallet as defined in claim 2 wherein a supporting foot is positioned in the medial portion of the pallet and is concentrically encompassed by a plurality of spaced corrugations, said corrugations being in the form of concentric rectangles to provide omni-directional strength and stiffness.

7. A pallet as defined in claim 6 wherein the pallet is rectangular in shape and is provided with corner supporting feet near each corner thereof and intermediately positioned feet aligned with said corner feet and the medially positioned foot.

8. A pallet as defined in claim 1 wherein the pallet is provided at its entire periphery with a continuous L-shaped downturned channel, one leg of said channel having the horizontally disposed exposed upper face thereof positioned in planar relation with the upper load-supporting surface of the pallet, the other leg of said channel extending downwardly of the upper face of the pallet, and a plurality of spaced reinforcing beams integral with the inner faces of said channel legs extending transversely thereof and in alignment with the spaced beams reinforcing the adjacent corrugations.

9. A pallet as defined in claim 6 wherein the pallet is provided with a series of spaced corrugations of a longitudinal length less than the adjacent marginal sides of the pallet, said corrugations terminating at the inclined walls of the supporting feet and being integrally molded therewith.

10. A pallet as defined in claim 1 wherein the pallet comprises a series of spaced corrugations positioned in parallel relation to each of the marginal sides of the pallet, the outermost corrugation at each side being integral with an L-shaped downturned channel at each side of the pallet, the corrugations adjacent each of the sides of the pallet terminating in integrally molded supporting corner feet positioned near each corner of the pallet, additional supporting feet positioned at each of the sides of the pallet intermediately of said corner feet, the side walls of said feet being integrally molded with the adjacent ends of said series of corrugations, the medial area of the pallet being constituted of a plurality of spaced corrugations molded in concentric rectangular pattern, and a supporting foot positioned medially of the pallet within the innermost rectangular shaped corrugation, the L-shaped channel being provided with a series of spaced reinforcing transverse beams aligned with the transverse reinforcing beams of the adjacent corrugation, the innermost medially positioned positioned rectangular corrugation being connected to the sides of the central leg by spaced reinforcing beams aligned with the spaced reinforcing beams of the adjacent corrugations and the outer concentric rectangular corrugations being reinforced at the corners thereof by diagonal reinforcing beams.

* * * * *

UNITED STATES PATENT OFFICE
CERTIFICATE OF CORRECTION

Patent No. 3,702,100    Dated November 7, 1972

Inventor(s) Thomas P. Wharton

It is certified that error appears in the above-identified patent and that said Letters Patent are hereby corrected as shown below:

IN THE ABSTRACT

Line 13, after "spaced" insert --beams or--.
Line 16, after "beams" cancel --or--.

IN THE SPECIFICATION

Column 1, line 46, cancel "at" and substitute --or--.
Column 5, line 65, cancel "rib" and substitue --rim--.
Column 7, line 66, cancel "nexted" and substitute --nested--.

IN THE CLAIMS

Column 9, line 52, cancel "portio" and substitute --portions--.
Column 12, line 1, cancel --positioned--. (first occurrence).

Signed and sealed this 29th day of October 1974.

(SEAL)
Attest:

McCOY M. GIBSON JR.
Attesting Officer

C. MARSHALL DANN
Commissioner of Patents